April 14, 1931.  J. O. HUNTER  1,801,159
EASY APPLYING AUTO CHAIN
Filed May. 3, 1930
Fig.1.
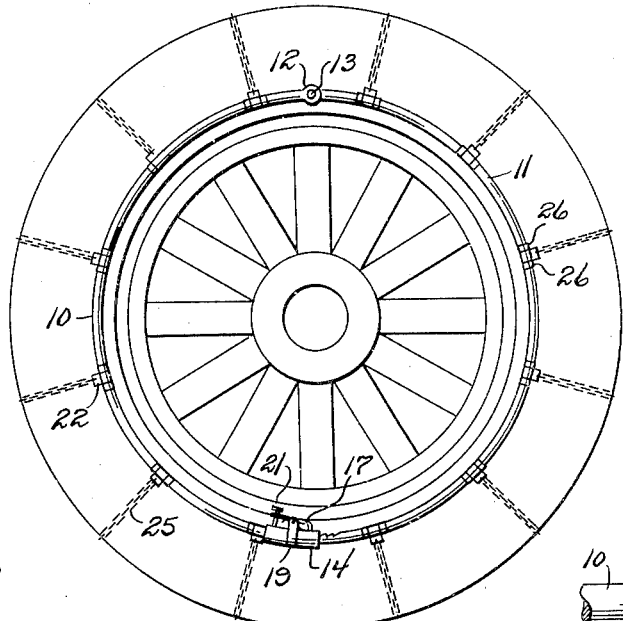
Fig.3.
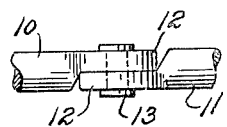
Fig.6.
Fig.2.
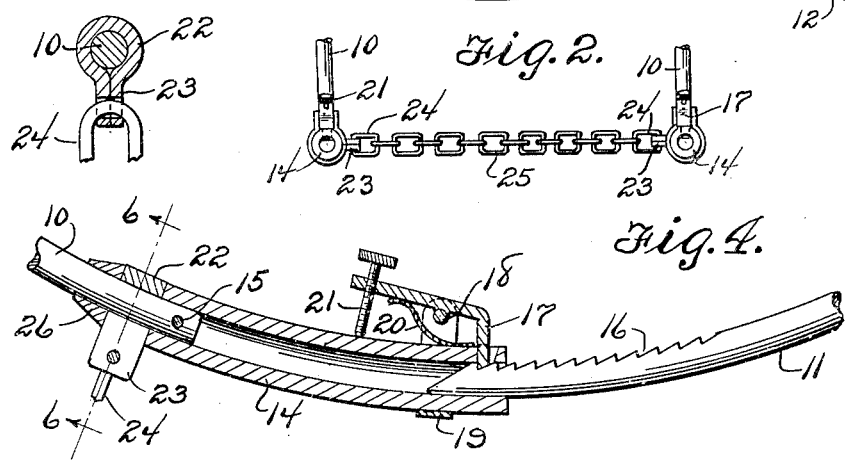
Fig.4.
Fig.5.
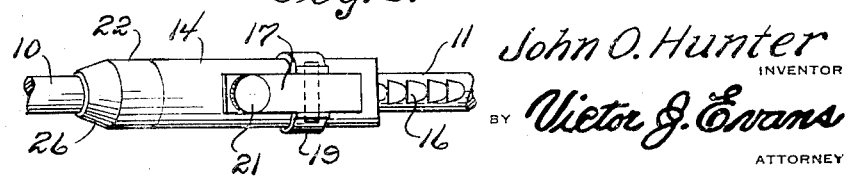
John O. Hunter
INVENTOR
BY Victor J. Evans
ATTORNEY Patented Apr. 14, 1931

1,801,159

UNITED STATES PATENT OFFICE

JOHN O. HUNTER, OF PETERSTOWN, WEST VIRGINIA

EASY-APPLYING AUTO CHAIN

Application filed May 3, 1930. Serial No. 449,594.

This invention relates to an improved form of anti-skid chain for motor vehicles.

The principal object of the invention is to provide a device of this character capable of being applied in a most effective and expeditious manner while the wheels are in one position and upon the ground.

Another object of the invention consists of adjusting means for the anti-skid device capable of taking up the least degree of slack.

More specifically stated the adjusting mechanism is provided with a lock whereby accidental displacement of the device from a desired adjusted position will be prevented.

With the above and other objects in view, the invention further consists of the following novel features and details of construction, to be hereinafter more fully described, illustrated in the accompanying drawing and pointed out in the appended claim.

In the drawing:

Figure 1 is a side elevation of a motor vehicle wheel showing the invention applied.

Figure 2 is an end elevation of the device showing the locking mechanism.

Figure 3 is an enlarged detail view of a connection established between sections of the anti-skid device.

Figure 4 is an enlarged fragmentary longitudinal sectional view taken through the adjustably secured ends of the anti-skid device.

Figure 5 is a top plan view of the aforementioned assembly.

Figure 6 is a sectional view taken on line 6—6 of Figure 4.

Referring to the drawing in detail wherein like characters of reference denote corresponding parts, the reference characters 10 and 11 indicate pairs of curved arms, preferably semi-circular, each of which having reduced ears 12 upon the adjacent ends thereof overlapped in the manner suggested in Figure 3 of the drawing to accommodate pivot pins 13 common to both. As will be inferred from the foregoing description and the accompanying drawing, two of the aforementioned assembly will be required, one upon each side of a tire. A sleeve member 14 secured to the opposite end of the curved arm through the employment of a cross pin 15, is designed to accommodate the remaining extremity of the curved arm 11 within its opposite end. The inner side of the curved arm adjacent that end telescopically associated with the sleeve 14 is adapted for adjustable locking connection with a pawl or dog 17 pivotally mounted for rocking movement, as at 18, between the extremities of a clamping band 19 carried upon the aforementioned sleeve. A spring finger 20 interposed between the adjacent portions of the pawl or dog 17 and the sleeve 14 normally induces said dog to occupy the Figure 4 position. A locking screw 21 carried upon the pawl or dog 17 is adapted for frictional engagement with the adjacent portion of the sleeve 14 to rigidly retain the dog 17 in the Figure 4 position after the device has been finally adjusted about a tire.

A multiplicity of clamping sleeves, such as indicated at 22, are passed around and about the curved arms 10 and 11 at spaced intervals thereon and which terminate to provide registering apertured ears 23 for the accommodation of the end links 24 of cross chains 25. The clamping sleeves 22 are held against independent circumferential movement about the curved arms 10 and 11 incident to the provision and arrangement of stop collars 26 arranged upon said arms at the respective ends of the clamping sleeves.

The invention is susceptible of various changes in its form, proportions and minor details of construction, and the right is herein reserved to make such changes as properly fall within the scope of the appended claim.

Having described the invention, what is claimed is:

An adjustable coupling for the adjacent ends of companion arms comprising a sleeve telescopically associated with and extended from one of the arms, the other arm being toothed and slidably adjustable within the sleeve, said sleeve having a transverse slot in communication with the bore thereof and exposing the teeth therethrough, a locking dog of L-shape formation pivotally and eccentrically mounted upon one side of the sleeve having one end projected within the slot for engagement with the teeth, a spring finger interposed between the other portion of the locking dog and sleeve to yieldably retain the first mentioned end of the dog within the slot, and a locking screw adjustably positioned upon the second mentioned end of the locking dog having perches against the immediate portion of the sleeve to prevent disengagement of the first mentioned end of the dog with the teeth.

In testimony whereof I affix my signature.

JOHN O. HUNTER.